United States Patent
Kazemi (10) Patent No.: US 11,131,562 B2
(45) Date of Patent: Sep. 28, 2021

(54) PEDESTRIAN PACE ESTIMATION WITH PACE CHANGE UPDATING

(71) Applicant: Apple Inc., Cupertino, CA (US)

(72) Inventor: Pejman Lotfali Kazemi, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 626 days.

(21) Appl. No.: 14/712,871

(22) Filed: May 14, 2015

(65) Prior Publication Data

US 2016/0334433 A1  Nov. 17, 2016

(51) Int. Cl.
*G01P 11/00* (2006.01)
*G01C 22/00* (2006.01)

(52) U.S. Cl.
CPC .................................. *G01C 22/006* (2013.01)

(58) Field of Classification Search
CPC .................................................. G01C 22/006
USPC ........................................................ 702/149
See application file for complete search history.

(56) References Cited

U.S. PATENT DOCUMENTS

| | | | |
|---|---|---|---|
| 7,797,106 B2 | 9/2010 | Kappi | |
| 8,593,343 B2 | 11/2013 | Waters et al. | |
| 2002/0143491 A1* | 10/2002 | Scherzinger | G01C 22/006 702/160 |
| 2014/0129189 A1 | 5/2014 | Gyorfi | |
| 2014/0180626 A1 | 6/2014 | Kimishima | |
| 2014/0288822 A1* | 9/2014 | Morrison | G01S 5/0257 701/466 |
| 2016/0007317 A1* | 1/2016 | Yang | G01P 15/14 455/456.6 |

* cited by examiner

*Primary Examiner* — Tha-O H Bui
(74) *Attorney, Agent, or Firm* — Fish & Richardson P.C.

(57) ABSTRACT

In an embodiment, a method includes receiving, by a processor of a mobile device, raw pedometer data from a pedometer included in or coupled to the mobile device. The processor receives raw GNSS data from a GNSS receiver included in or coupled to the mobile device. A first filter uses the raw pedometer data to estimate a step frequency of a user wearing or holding the mobile device. The processor determines a pace change from the estimated step frequency. Responsive to the pace change, the processor adapts a bandwidth of a second filter and estimates, by the second filter, an estimated pace or speed of the user.

20 Claims, 6 Drawing Sheets

PEDESTRIAN PACE ESTIMATION WITH PACE CHANGE UPDATING

TECHNICAL FIELD

This disclosure relates generally to pedestrian pace estimation.

BACKGROUND

Mobile devices are often used with fitness applications for monitoring and tracking fitness-related metrics such as distance walked or run, calorie consumption, and heartbeat. Mobile devices typically include motion sensors to detect when and how a mobile device is moving. For example, the mobile device can include an accelerometer that measures accelerations and generates motion signals from the acceleration data that describes the movement of the mobile device. A mobile device with a motion sensor can be configured with pedometer functionality that analyzes the motion signals to determine when a pedestrian user has taken a step. A step count can be used to estimate a step frequency or pace of the user. Pedestrian pace estimation that relies on motion signals can be inaccurate due to noisy sensor data and device body location.

Some mobile devices and fitness applications use velocity data provided by a Global Navigation Satellite System (GNSS) receiver to determine the speed of a pedestrian user. Like motion sensor data, GNSS receiver data is also sensitive to noise and device body location. Additionally, GNSS receiver data suffers from latency issues due to the inability of the GNSS receiver to adapt quickly to pace change.

SUMMARY

Systems, methods and non-transitory, computer-readable mediums are disclosed for pedestrian pace estimation with pace change detection.

In some implementations, a method comprises: receiving, by a processor of a mobile device, raw pedometer data from a pedometer included in or coupled to the mobile device; receiving, by the processor, raw GNSS data from a GNSS receiver included in or coupled to the mobile device; estimating, using a first filter implemented on the processor, a step frequency of a user wearing or holding the mobile device, the estimating including using the raw pedometer data; determining, by the processor, a pace change, the pace change determined from the estimated step frequency; responsive to the pace change, adapting by the processor, a bandwidth of a second filter implemented by the processor; and estimating, by the second filter, an estimated pace or speed of the user.

Particular implementations disclosed herein provide one or more of the following advantages. Adaptive bandwidth filters are used to estimate pedestrian pace or speed more accurately than conventional pedometer or GNSS estimation methods. The disclosed implementations can provide accuracy improvement for various device body locations (e.g., device in hand, device strapped to wrist or arm, user walking or running) as well as reduced latency.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview

Figure 1:
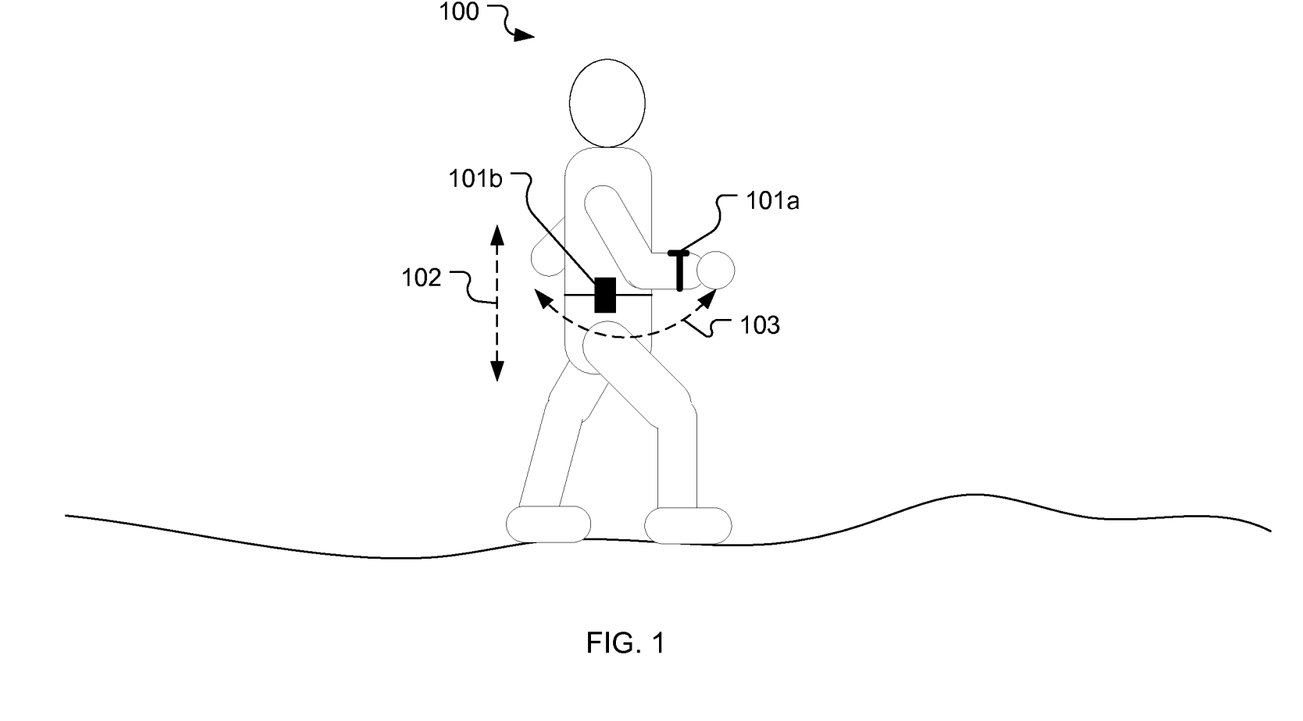
FIG. 1 illustrates the relationship of device body location on pedometer accuracy.

FIG. 1 ilustrates the relationship of device body location on pedometer accuracy. In the example shown, mobile device 101a (e.g., a smart watch) is worn by user 100 on her wrist and mobile device 101b (e.g., a smart phone) is worn by user 100 on her torso. Mobile device 101 (referring to mobile device 101a or 101b) includes a digital pedometer that uses sensor data to detect when user 100 takes a step. In some implementations, the digital pedometer detects a step each time a threshold is crossed by an acceleration modulus in the time domain. The acceleration modulus is calculated from an acceleration vector output by accelerometers of mobile device 101.

In some implementations, mobile device 101 performs frequency analysis on acceleration data to determine step count. For example, mobile device 101 can perform a frequency transform (e.g., Fast Fourier transformation (FFT)) on a windowed sample of acceleration data to generate a frequency spectrum of the acceleration data. Mobile device 101 can analyze the frequency spectrum of the acceleration data to determine a dominant frequency, which is indicated by a dominant peak in the frequency domain. The dominant frequency can be used to count the number of steps taken by the user. For example, if the dominant frequency is 2 Hz then the pedometer counts two steps per second.

The above-mentioned step counting techniques work well when the mobile device 101 is attached to the torso of user 100 (e.g., smart phone 101b) because the dominant force detected by the accelerometers is mostly due to vertical motion 102. However, when the mobile device is attached to the wrist of user 100 (e.g., smart watch 101a), the dominant force may be due to arm swing motion 103 rather than vertical motion 102, resulting in false step detection and inaccurate step count.

In some implementations, mobile device 101 uses a GNSS receiver to provide speed measurements. The speed measurements can be used to determine distance traveled for navigation or fitness applications running on mobile device 101. GNSS receivers implement a digital phase-lock loop (PLL) to continuously track a carrier frequency of a satellite signal. The difference between the known satellite carrier frequency and the frequency determined at the GNSS receiver is known as Doppler shift. Doppler shift is directly proportional to velocity of the GNSS receiver along the direction to the satellite. With multiple satellites tracked it is possible to determine a three-dimensional (3D) velocity vector of the GNSS receiver in a reference coordinate frame, such as Earth-Centered-Earth-Fixed (ECEF) or East-North-Up (ENU). The magnitude or modulus of the velocity vector is the speed of the GNSS receiver and therefore the speed of mobile device 101. To use GNSS for pace estimation, one must deal with latency, noise and device body location. For example, when using mobile device 101a, arm swing motion 103 may be the dominant force rather than vertical motion 102.

Example System

Figure 2:
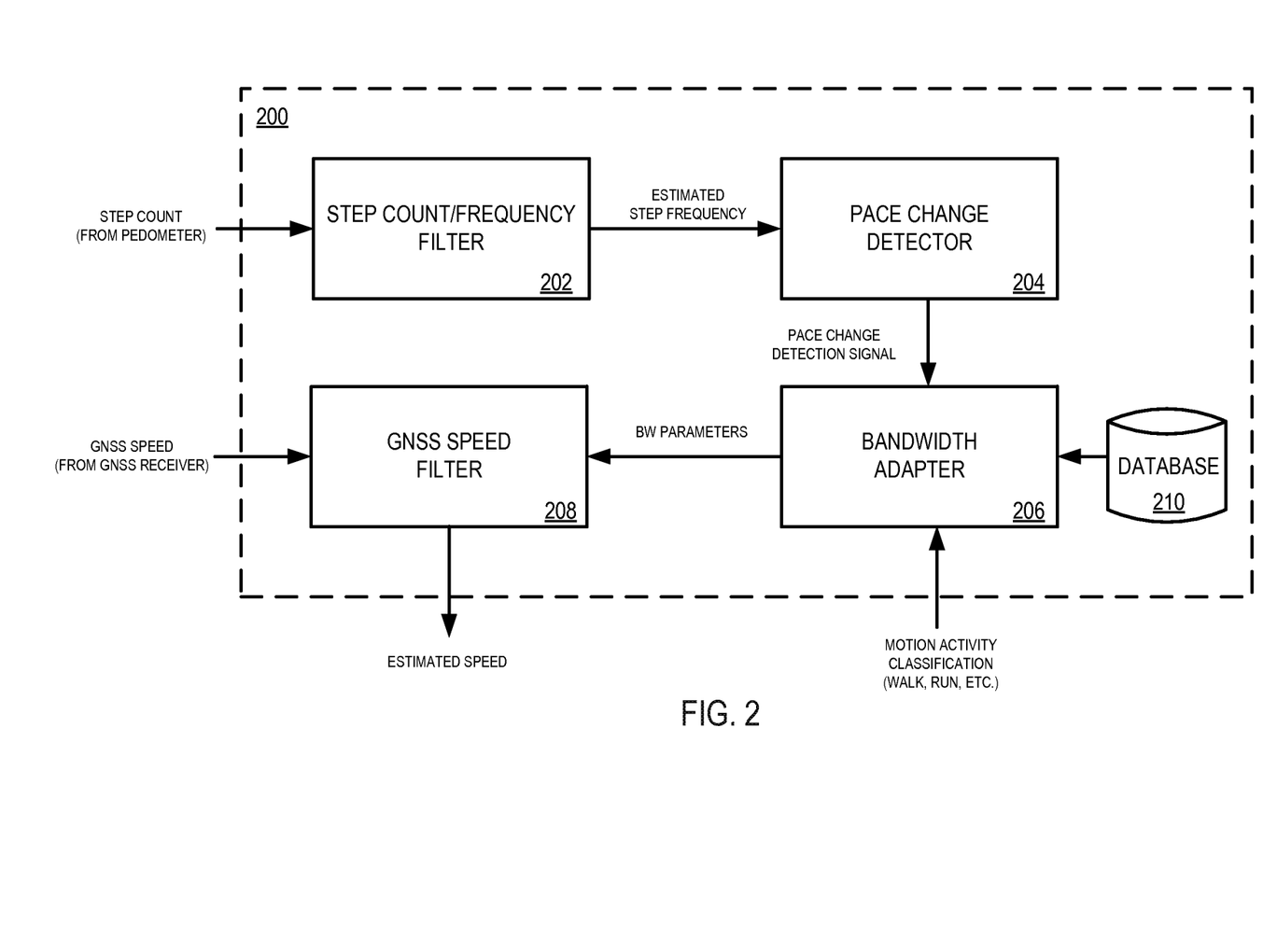
FIG. 2 is a block diagram illustrating an example system for pedestrian pace estimation.

FIG. 2 is a block diagram illustrating an example system 200 for pedestrian pace estimation. In some implementations, system 200 can include step count/frequency filter 202, pace change detector 204, GNSS speed filter 208 and bandwidth adapter 206. Bandwidth adapter 206 can be coupled to database 210, which can store bandwidth (BW) parameters, as described in further detail below. Filters 202, 208 are estimation filters and can be implemented using one of a maximum likelihood estimator, Bayes estimator, minimum means squared error (MMSE) estimator, particle filter and a Kalman filter.

In some implementations, filter 202 is implemented by a Kalman filter as described below. Filter 202 receives a raw step count from a digital pedometer included in or coupled to mobile device 101a, 101b.

State Prediction

The state prediction equation is given by $$\hat{x}_{k|k-1} = \Phi_k \hat{x}_{k-1|k-1}, \quad [1]$$

where $\hat{x}_{k|k-1} = [\hat{x}_{k|k-1}, \hat{\dot{x}}_{k|k-1}]$ is a two-element state vector, $\hat{x}_{k|k-1}$ is the predicted (a prior) step count estimate, $\hat{\dot{x}}_{k|k-1}$ is the predicted (a prior) step frequency estimate and $$\Phi = \begin{bmatrix} 1 & \Delta t \\ 0 & 1 \end{bmatrix}$$

is a 4 element state transition matrix.

Covariance Prediction

The predicted (a prior) error covariance estimate is given by $$P_{k|k-1} = \Phi_k P_{k-1|k-1} \Phi_k^T + Q_k, \quad [2]$$

$$P = \begin{bmatrix} p_0 & p_2 \\ p_2 & p_1 \end{bmatrix},$$

$$Q = \begin{bmatrix} q_0 & 0 \\ 0 & q_1 \end{bmatrix}.$$

Applying matrix multiplication in [2] gives the error covariance matrix elements $$p_0 = p_0 + p_2 * \Delta t + \Delta t(p_2 + p_1 * \Delta t) + q_0,$$

$$p_1 = p + q_1,$$

$$p_2 = p_1 + \Delta t p_2,$$

where $q_0, q_1$ is process noise, $\Delta t$ is a time step and the diagonal elements $p_0$ and $p_1$ are initialized with a large integer value that can be determined empirically (e.g., 100).

Kalman Gain

The equation for Kalman gain is given by $$K_k = P_{k|k-1} H_k^T (H_k P_{k|k-1} H_k^T + R_k)^{-1},$$

where R is a measurement noise matrix and H=[1 0] is an observation matrix. Applying matrix multiplication in [3] gives the Kalman gain vector elements $$k_0 = \frac{P_0}{P_0 + r},$$

$$k_1 = \frac{P_2}{P_0 + r},$$

where the measurement noise r can be determined empirically.

State Update

The state update (a posteriori) equation is given by $$\hat{x}_{k|k} = \hat{x}_{k|k-1} + K_k(z_k - H_k \hat{x}_{k|k-1}),$$

where $z_k$ is an observation vector. Noting that there is only a single measurement (the raw step count) and applying multiplication in [4], the updated state vector elements are given by $$\hat{x}_{k|k} = \hat{x}_{k|k-1} + k_0(z_k - \hat{x}_{k|k-1}),$$

$$\hat{\dot{x}}_{k|k} = \hat{\dot{x}}_{k|k|k'11}(z_k - \hat{x}_{k|k-1}). \quad [5]$$

Covariance Update

The covariance update (a posteriori) equation is given by:

$$P_{k|k} = (1 - K_k H_k) P_{k|k-1},$$

where the elements of the updated covariance matrix are given by $$p_0 = p_0 - k_0 * p_0,$$

$$p_1 = p_1 - k_1 * p_2,$$

$$p_2 = p_2 - \frac{(p_2 + p_0)}{p_0 + r}.$$

The Kalman filter described by equations [1]-[5] provides step count and step frequency estimates based on raw step counts provided by the digital pedometer of mobile device 101. The estimated step rate is input into pace change detector 204, which detects when the pedestrian pace has changed by a threshold amount.

In some implementations, pace change detector 204 is implemented using a one-dimensional (1D), n-order moving median filter. The moving median filter is applied to a sample of estimated step frequencies output by filter 202. The median calculated by the moving median filter is compared to a threshold value (e.g., 0.005). In some implementations, different threshold values can be used for different types of pace change. For example, a first threshold can be used for a severe pace change (e.g., a sudden stop) and a second threshold value can be used for a gradual and smooth pace change. The median is the number separating the higher half of the sample from the lower half. The median can be found by arranging the step frequencies in the sample from the lowest value to the highest value and picking the middle one. For example, the median of the data set S={2, 2, 4, 8, 10} is 4. If there is an even number of step frequencies, then there is no single middle value and the median can be defined to be the mean of the two middle step frequencies.

TABLE I below illustrates a moving median filter. In this example, the moving median filter takes a sample of step frequencies, and for a given span (e.g., 5) for the filter, takes a subset of those step frequencies, centered at a position x in the subset, and returns the median for the subset. Table I illustrates the operation of a median filter on the data set S={1, 1, 2, 3, 3, 4, 4, 5, 6, 6} with a span or moving window of 5.

TABLE I

Example Illustrating Moving Median Filtering

| Subset | Subset Data | Median |
|---|---|---|
| 1 | {1, 1, 2, 3, 3} | 2 |
| 2 | {1, 2, 3, 3, 4} | 3 |
| 3 | {2, 3, 3, 4, 4} | 3 |
| 4 | {3, 3, 4, 4, 5} | 4 |
| 5 | {3, 4, 4, 5, 6} | 4 |
| 6 | {4, 4, 5, 6, 6} | 5 |

If the median calculated by the moving median filter exceeds the threshold value, a pace change signal is generated by pace change detector 204 and provided as input to BW adapter 206. In some implementations, the pace change signal can be a Boolean flag that is set to TRUE when a pace change is detected.

In some implementations, BW adapter 206 receives the pace change detection signal and in response selects one or more BW parameters from database 210 and provides the BW parameters to GNSS speed filter 208. The BW parameters are used by GNSS speed filter 208 to determine how much to weigh raw GNSS speed measurements. The BW parameters can also specify a time window that determines how long the BW parameters should be used by GNSS speed filter 208. In some implementations, the BW parameters include one or more Kalman filter process noise parameters, which can be used to adapt or replace the process noise parameters in a Kalman filter implemented by GNSS speed filter 208 during a time window. By increasing the process noise (increasing the bandwidth of GNSS speed filter 208) for the time window (e.g., 5 seconds), GNSS speed filter 208 can catch up with the changed pace and provide more accurate pedestrian pace estimates, as described in further detail below.

In some implementations, BW adapter 206 receives a motion activity classification signal and in response selects one or more BW parameters from database 210 and provides the BW parameter(s) to GNSS speed filter 208. Motion activity classifications can include but are not limited to the following motion activities: stationary, walking, running, cycling, etc. Each one of these motion activity classifications can be associated with one or more Kalman filter process noise parameters stored in database 210. In some implementations, the Kalman filter process noise parameters for motion activity classes are used to adapt or replace the process noise parameters in a Kalman filter (e.g., default process noise parameters) implemented by GNSS speed filter 208. Accordingly, BW adapter 206 adapts the bandwidth of GNSS speed filter 208 whenever a pace change or new motion activity classification is detected.

In some implementations, the GNSS receiver employs dynamic power optimization (DPO), where GNSS satellite tracking occurs at full power during a "dwell" period and is then placed in a low power mode for the remainder of the duty cycle. For example, if the duty cycle of the GNSS receiver is 1 second the dwell period can be 200 ms at full power and 800 ms at low power. Accordingly, a DPO notification can be used to trigger tuning of the GNSS receiver by, for example, adapting the process noise.

In some implementations, the Kalman filter is implemented in GNSS speed filter 208 as described below. Filter 208 receives raw GNSS speed from a GNSS receiver included in or coupled to mobile device 101. Examples of GNSS receivers include Global Position System (GPS), Russian GLONASS, BeiDou (Compass) and Galileo. In the Kalman filter below there is only a single state so vector and matrix notation is omitted.

State Prediction

The state estimate prediction (a priori) equation is given by:

$$\hat{x}_{k|k-1} = \hat{x}_{k-1|k-1},$$

where $\hat{x}_{k|k-1}$ is an estimate of GPS speed.

Covariance Prediction

The error covariance estimate prediction (a priori) equation is given by:

$$p_{k|k-1} = p_{k-1|k-1} + q_k \frac{\Delta t^2}{2}, \quad [7]$$

where q is process noise, $\Delta t$ is a time step and the error covariance $p_{k|k-1}$ can be initialized with a large integer value that is determined empirically (e.g., 100).

Kalman Gain

The equation for Kalman gain is given by $$k_k = \frac{p_{k|k-1}}{p_{k|k-1} + r_k}, \quad [8]$$

Where the measurement noise r can be determined empirically (e.g., r=16).

State Update

The state update equation is given by $$\hat{x}_{k|k} = \hat{x}_{k|k-1} + k_k^*(z_k - \hat{x}_{k|k-1}), \quad [9]$$

where $z_k$ is the raw GNSS speed provided by the GNSS receiver.

Covariance Update

The covariance update equation is given by $$p_{k|k} = (1-k_k)p_{k|k-1}. \quad [10]$$

The value of the process noise q in equation [7] above can be initially set to a default value. In response to a pace change or a change in motion activity class, the process noise q can be adapted (e.g., adjusted or replaced) with a different value. In the case of a pace change detection event, the process noise q can be increased to increase the bandwidth of filter 208 for a specified time window. This forces filter 208 to weigh the measurements (raw GPS speed) from the GNSS receiver more heavily during the time window to allow filter 208 to catch up with the new pace. The time window can be determined empirically and can be constant or adaptive. For example, the time window may be adapted based on the current motion activity class or other information. In the case of a change of motion activity classification, the process noise value can be adapted (e.g., adjusted or replaced) with a different value to allow filter 208 to catch up with the new motion activity class. For example, the process noise q can be larger for stationary or walking motion activity classes and smaller for cycling or running motion activity classes.

In some implementations, filters 202, 208 can be adapted if the time step $\Delta t$ exceeds a maximum value. For example, if the raw step count or GNSS speed data input to filters 202, 208, respectively, have not changed for a maximum threshold time (e.g., 20 seconds) or a new raw step count or GNSS speed has not been received for a maximum threshold delay time (e.g., 8 seconds), filters 202, 208 can be reset by, for example, reinitializing the state and covariance elements. In some implementations, the raw step counts and GNSS speeds can be validated before being processed by filters 202, 208. If the raw step count or GNSS speed is invalid (e.g., diverging over several measurement cycles) it can be discarded so that it is not processed by filters 202, 208.

Example System Including Pedometer Bias Estimation

Figure 3:
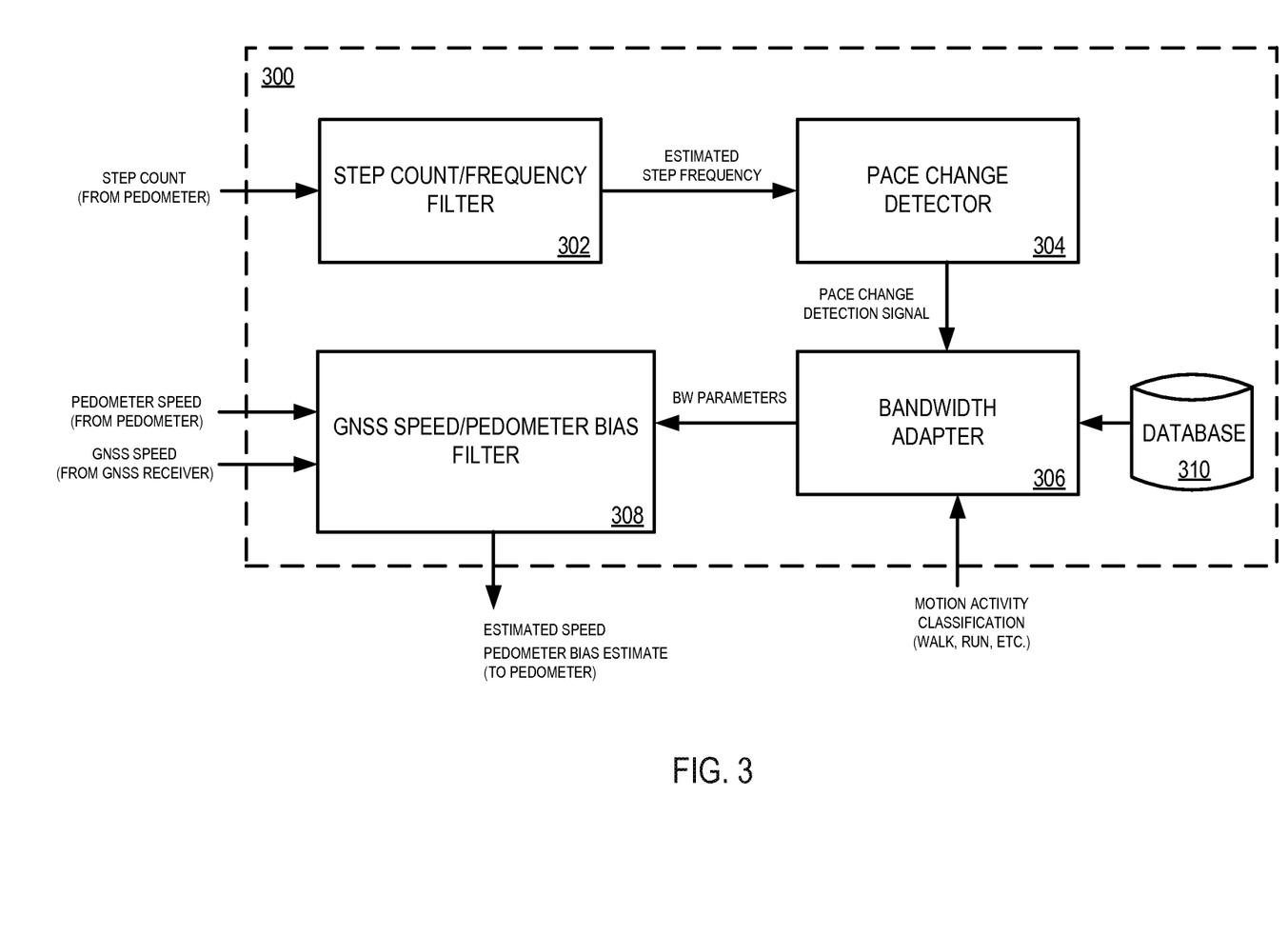
FIG. 3 is a block diagram illustrating an example system for pedestrian pace and pedometer bias estimation.

FIG. 3 is a block diagram illustrating an example system 300 for pedestrian pace and pedometer bias estimation. System 300 operates in a similar manner as system 200 except that the GNSS speed filter 208 (now referred to as GNSS speed/pedometer bias filter 302) includes an additional pedometer bias state and receives raw pedometer speed measurements from the digital pedometer. The pertinent matrices used in the Kalman filter formulation are given by:

$$\hat{x}_{k|k-1} = [\hat{v}_{k|k-1}, \hat{b}_{k|k-1}],$$

$$\Phi_k = \begin{bmatrix} 1 & 0 \\ 0 & 1 \end{bmatrix},$$

$$Q = \begin{bmatrix} q_w & 0 \\ 0 & q_b \end{bmatrix},$$

$$H = \begin{bmatrix} 1 & 0 \\ 1 & 1 \end{bmatrix},$$

$$R = \begin{bmatrix} r & 0 \\ 0 & r' \end{bmatrix},$$

[11]

where $\hat{x}_{k|k-1}$ is a two element state vector, $\hat{v}_{k|k-1}$ is the estimated GPS speed and $\hat{b}_{k|k-1}$ is the estimated pedometer bias. $\hat{b}_{k|k-1}$ is modeled as a random walk given by $\hat{b}_{k|k-1} = \hat{b}_{k-1|k-1} + u_k$, where $u_k$ is a zero mean random value. Q is the process noise covariance matrix, where $q_w$ is zero mean GPS process noise and $q_b$ is zero mean pedometer process noise. R is the measurement noise covariance matrix, where r'<<r since pedometer measurement noise r' is much less than GPS measurement noise r.

One with ordinary skill in the art would understand how to modify Kalman filter equations [6]-[10] using the matrices [11] defined above. The estimated pedometer bias can be used to adjust the pedometer speed output by, for example, subtracting the estimated pedometer bias from the pedometer speed.

Example Process

Figure 4:
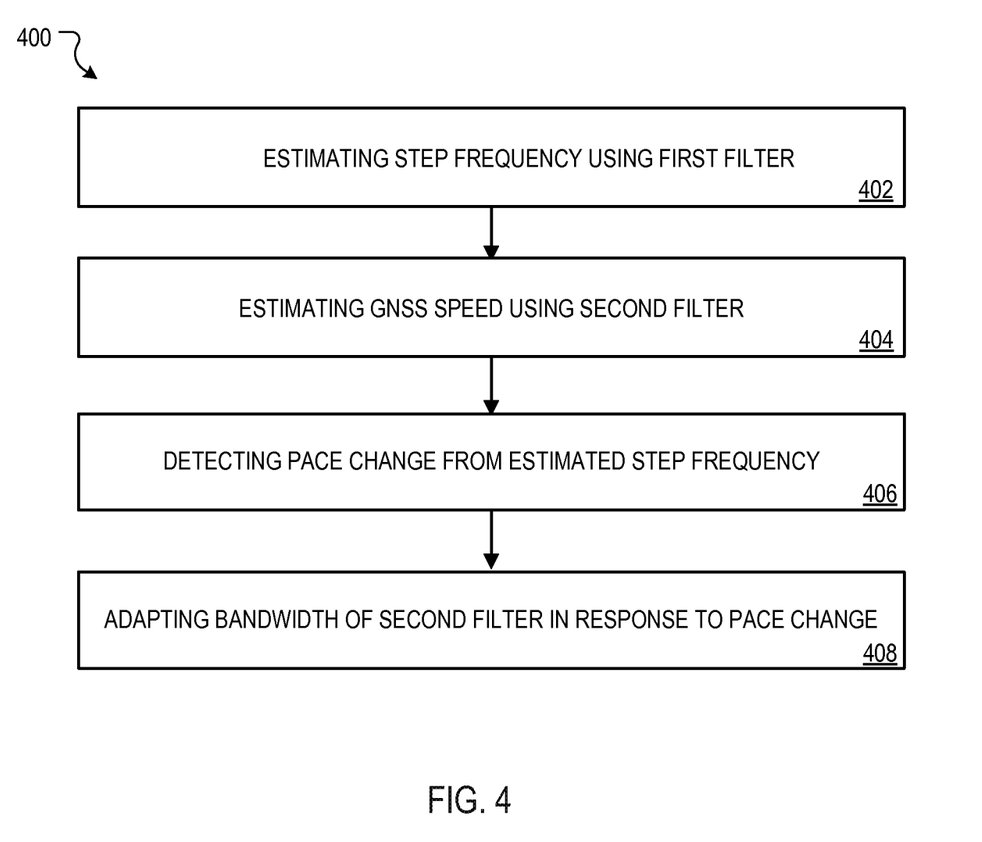
FIG. 4 is a flow diagram of an example process for pedestrian pace estimation.

FIG. 4 is a flow diagram of an example process 400 performed by system 200. Process 400 can be implemented by mobile device architecture 600, as described in reference to FIG. 6.

Some examples of mobile devices include but are not limited to a smart watch and smart phone. In some implementations, a user can wear or hold a smart watch and smart phone. The smart watch and smart phone can communicate over a wired or wireless communication medium. In some implementations, the estimating can be performed by software and/or hardware of the smart phone or the smart watch using raw pedometer data provided by the smart phone and or watch. In some implementations, the user can wear a digital pedometer on their shoe and pedometer data can be sent to a smart phone, smart watch or other device (e.g., a media player) for further processing.

The term "raw" when referring to data means data that has not been processed by the first or second filter as described herein. It should be noted that raw data can include data that was previously processed by another filter or process inside the pedometer or GNSS receiver.

Referring now to FIG. 4, in some implementations, process 400 can begin by estimating step frequency using a first filter (402). For example, the first filter can be a Kalman filter that estimates step count and step frequency based on raw step counts generated by a digital pedometer.

Process 400 can continue by estimating GNSS speed using a second filter (404). For example, the second filter can be a Kalman filter that estimates GNSS speed based on raw velocity or speed measurements provided by a GNSS. Some examples of GNSS receivers include but are not limited to GPS receivers.

Process 400 can continue by detecting a pace change from the estimated step frequency (406). For example, a set of step frequency estimates output by the first filter can be input to a moving median filter, which calculates a median estimated frequency from the set. The median step frequency is then compared with a threshold value. If the median step frequency exceeds the threshold value, a pace change is detected. A pace change signal is then generated and sent to the second filter. In some implementations, the pace change signal can be a Boolean flag that is set to TRUE when a pace change is detected.

Process 400 can continue by adapting the bandwidth of the second filter in response to the pace change signal (408). For example, one or more process noise values can be adapted (e.g., adjusted or replaced) to adapt the bandwidth of the second filter. In some implementations, the process noise values can be replaced with different process noise values (e.g., larger process noise values) to allow the second filter to catch up with the new pace. In some implementations, the second filter can be configured to use the different process noise values for a specified time window, then revert back to the previous process noise values or other process noise values, such as default process noise values or process noise values that correspond to a motion activity classification, such as stationary, walking, running, cycling, etc.

In some implementations, the process noise parameters are adapted during a dwell period (e.g., 200 ms) when the GNSS receiver is not computing velocity data. The start of the dwell period can be provided by the GNSS receiver and provides a window of opportunity to tune the filter 208 (e.g., adapt the bandwidth) between measurements.

In some implementations, the pedometer and GNSS receiver data can be validated before being processed by the first and second filters. For example, if the data is diverging for a number of measurement cycles, then the data can be discarded. In some implementations, the first or second filters can be reset based on a number of trigger events, such as pedometer or GNSS receiver data not changing for a specified maximum time period or new pedometer or GNSS receiver data not being received by the first or second filters, respectively, for a specified maximum delay period.

Figure 5:
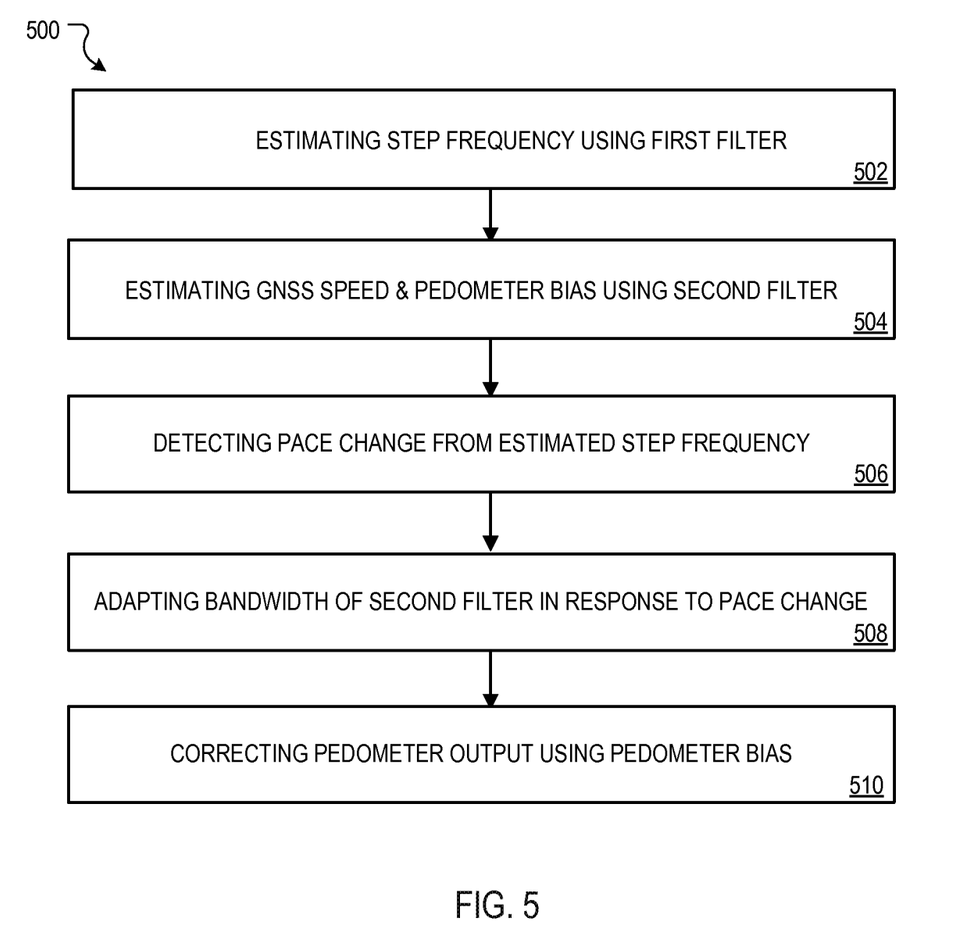
FIG. 5 is a flow diagram of an example process for pedestrian pace and pedometer bias estimation.

FIG. 5 is a flow diagram of an example process 500 performed by system 300. Process 500 can be implemented by the device architecture 600, as described in reference to FIG. 5.

In some implementations, process 500 can begin by estimating step frequency using a first filter (502). For example, the first filter can be a Kalman filter that estimates step count and step frequency based on raw step counts generated by a digital pedometer.

Process 500 can continue by estimating GNSS speed and pedometer bias using a second filter (504). For example, the second filter can be a Kalman filter that estimates GNSS speed and pedometer bias based on raw velocity or speed measurements output by a GNSS receiver.

Process 500 can continue by detecting a pace change from the estimated step frequency (506). For example, a set of step frequency estimates output by the first filter can be input to a moving median filter, which calculates a median estimated frequency from the set. The median step frequency is then compared with a threshold value. If the median step frequency exceeds the threshold value, a pace change is detected. A pace change signal is then generated and sent to the second filter. In some implementations, the pace change signal can be a Boolean flag that is set to TRUE when a pace change is detected.

Process 500 can continue by adapting the bandwidth of the second filter in response to the pace change signal (508). For example, one or more process noise values can be adapted (e.g., adjusted or replaced) to adapt the bandwidth of the second filter. In some implementations, the process noise values can be replaced with different process noise values (e.g., larger process noise values) to allow the second filter to catch up with the new pace. The second filter can be configured to use the different process noise values for a specified time window, then revert back to the previous process noise values or other process noise values, such as default process noise values or process noise values that correspond to a motion activity classification, such as stationary, walking, running, cycling, etc.

Process 500 can continue by correcting the pedometer data using the estimated pedometer bias (510). For example, the estimated pedometer bias can be subtracted from the pedometer speed that is output by the digital pedometer.

Example Device Architecture

Figure 6:
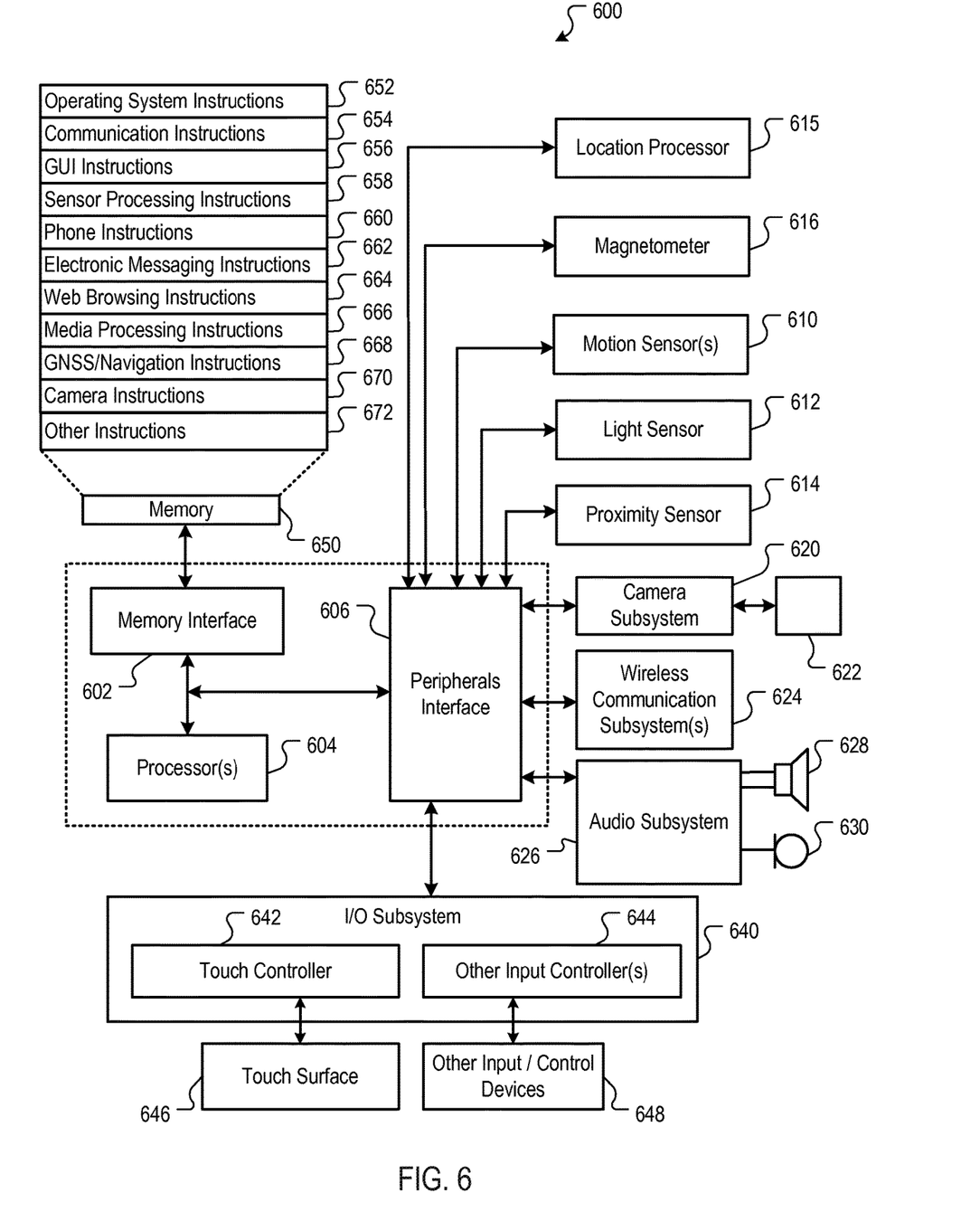
FIG. 6 is a block diagram of example device architecture for implementing the features and processes described in reference to FIGS. 1-5.

FIG. 6 is a block diagram of example device architecture 600 for implementing the features and processes described in reference to FIGS. 1-5. Device architecture 600 may be implemented in any location aware mobile device for generating the features described in reference to FIGS. 1-5, including but not limited to portable computers, smart phones, tablet computers, game consoles, wearable computers and the like. Device architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor 610, light sensor 612, and proximity sensor 614 may be coupled to peripherals interface 606 to facilitate orientation, lighting, and proximity functions of the device. For example, in some implementations, light sensor 612 may be utilized to facilitate adjusting the brightness of touch surface 646. In some implementations, motion sensor 610 (e.g., an accelerometer, gyros) may be utilized to detect movement and orientation of the device.

Accordingly, display objects or media may be presented according to a detected orientation (e.g., portrait or landscape).

Other sensors may also be connected to peripherals interface 606, such as a temperature sensor, a biometric sensor, or other sensing device, to facilitate related functionalities.

Location processor 615 (e.g., GNSS receiver chip) may be connected to peripherals interface 606 to provide georeferencing. Electronic magnetometer 616 (e.g., an integrated circuit chip) may also be connected to peripherals interface 606 to provide data that may be used to determine the direction of magnetic North. Thus, electronic magnetometer 616 may be used as an electronic compass.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, the TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, and telephony functions.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device 600 may present recorded audio and/or video files, such as MP3, AAC, and MPEG video files. In some implementations, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device.

Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and other instructions 672 for performing some or all of the processes, as described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a processor of a mobile device, raw pedometer data from a pedometer included in or coupled to the mobile device, the raw pedometer data generated by one or more motion sensors of the mobile device;
   receiving, by the processor, raw Global Navigation Satellite System (GNSS) data from a GNSS receiver included in the mobile device and coupled to the processor;
   estimating, using a first filter implemented on the processor and the raw pedometer data, a step frequency of a user wearing or holding the mobile device;
   determining, by the processor and based on data provided by the GNSS receiver, a start of a dwell period, where the dwell period is a time required to test for presence of a GNSS satellite signal;
   responsive to the determining, estimating, using a second filter implemented on the processor and based on the raw GNSS data, a first speed of the user;
   determining, by the processor, a pace change, the pace change determined from the estimated step frequency;
   responsive to the pace change, adapting by the processor, a bandwidth of the second filter;
   estimating, by the second filter and using the adaptive bandwidth, a second speed of the user; and
   sending the second speed of the user to an application running on the processor.

2. The method of claim 1, wherein the raw pedometer data is step count or step frequency and the raw GNSS data is speed or velocity.

3. The method of claim 1, wherein the pace change is determined by comparing estimated step frequency with a threshold value.

4. The method of claim 1, wherein the first and second filters are Kalman filters.

5. The method of claim 4, wherein the first Kalman filter is configured to estimate step count and step frequency using raw step counts and the second Kalman filter is configured to estimate GNSS speed.

6. The method of claim 5, wherein the second Kalman filter is configured to estimate GNSS speed and pedometer bias.

7. The method of claim 6, wherein adapting the bandwidth of the second filter further comprises:
   replacing a process noise value in the second Kalman filter with a different process noise value.

8. The method of claim 7, wherein the different process noise value is used by the second Kalman filter for a time window and then reverts back to a previous process noise value or another process noise value.

9. The method of claim 1, further comprising:
determining a change in a motion activity classification; and
adapting the bandwidth of the second filter based on the determining.

10. The method of claim 1, wherein determining the pace change further comprises:
filtering, by a moving median filter, a set of step frequency estimates; and
determining the pace change based on a median estimated step frequency determined by the moving median filter.

11. A system comprising:
a Global Navigation Satellite System (GNSS) receiver;
one or more motion sensors;
one or more processors;
one or more non-transitory, computer-readable mediums coupled to the one or more processors and configured to store instructions, which, when executed by the one or more processors, causes the one or more processors to perform operations comprising:
receiving, by the processor of a mobile device, raw pedometer data from a pedometer included in or coupled to the mobile device, the raw pedometer data generated by one or more motion sensors of the mobile device;
receiving, by the processor, raw GNSS data from the GNSS receiver included in the mobile device and coupled to the processor;
estimating, using a first filter implemented on the processor and the raw pedometer data, a step frequency of a user wearing or holding the mobile device;
determining, by the processor and based on data provided by the GNSS receiver, a start of a dwell period, where the dwell period is a time required to test for presence of a GNSS satellite signal;
responsive to the determining, estimating, using a second filter implemented on the processor and based on the raw GNSS data, a first speed of the user;
determining, by the processor, a pace change, the pace change determined from the estimated step frequency;
responsive to the pace change, adapting by the processor, a bandwidth of the second filter;
estimating, by the second filter and using the adaptive bandwidth, a second speed of the user; and
sending the second speed of the user to an application running on the processor.

12. The system of claim 11, wherein the raw pedometer data is step count or step frequency and the raw GNSS data is speed or velocity.

13. The system of claim 11, wherein the pace change is determined by comparing estimated step frequency with a threshold value.

14. The system of claim 11, wherein the first and second filters are Kalman filters.

15. The system of claim 14, wherein the first Kalman filter is configured to estimate step count and step frequency using raw step counts and the second Kalman filter is configured to estimate GNSS speed.

16. The system of claim 15, wherein the second Kalman filter is configured to estimate GNSS speed and pedometer bias.

17. The system of claim 16, wherein adapting the bandwidth of the second filter further comprises:
replacing a process noise value in the second Kalman filter with a different process noise value.

18. The system of claim 17, wherein the different process noise value is used by the second Kalman filter for a time window and then reverts back to a previous process noise value or another process noise value.

19. The system of claim 11, wherein the operations further comprise:
determining a change in a motion activity classification; and
adapting the bandwidth of the second filter based on the determining.

20. The system of claim 11, wherein determining the pace change further comprises:
filtering, by a moving median filter, a set of step frequency estimates; and
determining the pace change based on a median estimated step frequency determined by the moving median filter.

* * * * *